United States Patent [19]

Shedeur

[11] Patent Number: 5,520,541
[45] Date of Patent: May 28, 1996

[54] APPARATUS FOR TEACHING NUMBERS AND MATHEMATICS

[76] Inventor: Michelle R. Shedeur, 17611 W. 16th Ave. #203, Golden, Colo. 80401

[21] Appl. No.: 300,972

[22] Filed: Sep. 6, 1994

[51] Int. Cl.⁶ .................................................. G09B 1/02
[52] U.S. Cl. .......................... 434/200; 434/205; 434/201; 273/272
[58] Field of Search .................................... 434/200, 201, 434/191, 205; 273/272

[56] References Cited

U.S. PATENT DOCUMENTS

| | | |
|---|---|---|
| 480,164 | 8/1892 | Barrett . |
| 502,184 | 7/1893 | Gallegos . |
| 1,997,177 | 1/1931 | Holiday . |
| 2,887,789 | 5/1959 | Bobo et al. . |
| 3,085,358 | 4/1963 | Hramiec .................................. 434/200 |
| 3,469,325 | 9/1969 | Greenberg ........................... 434/191 X |
| 3,837,096 | 9/1974 | Sterling ..................................... 35/31 D |
| 4,553,944 | 11/1985 | Flanagan ................................. 434/191 |
| 4,884,973 | 12/1989 | Pak ........................................... 434/191 |
| 5,040,987 | 8/1991 | Frazier ................................. 434/205 X |
| 5,346,399 | 9/1994 | Sakow ................................. 434/200 X |
| 5,374,065 | 12/1994 | Motskin ................................... 273/272 |

*Primary Examiner*—Robert A. Hafer
*Assistant Examiner*—Michael O'Neill
*Attorney, Agent, or Firm*—Thomas J. Loran

[57] ABSTRACT

The present invention is a method and an apparatus to teach students the relation of numbers and identical items to mathematics by having the students visually and manually associating numbers with items and the adding and subtracting of these items. The apparatus hardware and the teaching method are designed to be depicted on a computer monitor screen with visual and manual manipulations of items on the hardware or on the screen to teach and relate skills to students by permitting use in either or both media.

6 Claims, 2 Drawing Sheets

APPARATUS FOR TEACHING NUMBERS AND MATHEMATICS

BACKGROUND OF THE INVENTION

1. Field of the Invention

The present invention is generally directed to a method and an apparatus to teach students the relation of numbers and items to mathematics by having the students visually and manually associate numbers with items, and then add and subtract these items. This invention of visual and manual manipulations of items on apparatus hardware is designed to relate with similar manipulations using the apparatus depicted on a computer screen. This teaches and relates skills to students by permitting use in either or both media.

2. Description of the Prior Art

Instruction devices teaching mathematical relationships and basic algebraic equations such as addition and subtraction have been available for more than one hundred years. Many of the various apparatus to aid teaching school children involve intricate and confusing structures, partial instruction concerning only addition and subtraction equations, or minimal student manual involvement relating numbers to items and mathematics. These devices are described in U.S. Pat. Nos. 4,884,973; 4,553,944; 3,837,096; 2,887,789; 1,997,177; 502,184; and 480,164.

Several of these patents assume that the student knows numbers but not mathematics. Some combine the items into indistinguishable groups with no visual orderly display to numbers, and others do not permit the student to handle or singularly manipulate the correct number of items relating to a number. Most involve a display apparatus but do not allow the student to physically handle and count individual items as part of the instruction. To overcome these difficulties, the present invention found that the memory of numbers and mathematical facts may be enhanced by using a special apparatus and method.

None of these prior patents has designed the utility hardware to relate to the teaching medium of computers thereby teaching association of real objects to computer displays. With students today using computers and computer methods, the present apparatus and method permit teaching mathematics with a hardware apparatus and also an option of using the same apparatus and teaching method when displayed on a computer screen.

SUMMARY OF THE INVENTION

The present invention generally describes an instructional apparatus and method of teaching numbers, number addition and number subtraction to pre-school children, school children, children having learning disabilities, and other students. In this invention a student's visual review of new information, organization into logical and visual order, and manual involvement of placing and counting objects relating to numbers facilitate storage in the human memory system. The apparatus and method accomplish teaching by allowing a student to manipulate and display singularly in rows, on a board, identical items relating to numbers and equations.

The teaching method of identical item quantity relating to displayed numbers and mathematical instructions is accomplished by asking the student to visualize numbers and items and physically place items in a visually depicted and orderly group, hold, count, and manipulate the items according to numerical instruction. This instructional combination easily teaches students numbers, relationships of numbers to items, and the addition and subtraction of numbers and items.

The instructional apparatus has a display board with a pair of bins on opposite ends for receiving and storing identical items such as marbles and two series of object display sections. Each display section has preferably eighteen singular receptacles arranged in a pattern of rows for holding singular items that can easily be removed. The display sections are separated by an interval where a moveable and interchangeable addition sign (+) or subtraction sign (−) may be placed. An equal sign (=) is permanently positioned to the right of the display sections and in front of the receiving bin.

The student observes a number written on a visual information card or an equation comprising two numbers that are added or subtracted, and combined with an equal sign and answer. For a primary learner, the number of items relating to display number is placed in the display rows. Later, after learning the numbers relating to items, the student follows the mathematical equation and places the correct + or − sign in the interval between the display sections. The items are then positioned in the respective display rows according to the amounts on the left side of the equation. The student then follows the equation and determines the answer by placing and counting the items into the receiving bin. The association between numbers and equations by handling the correct amount of items, then visually observing the orderly amount of items in rows and sections relative to the display card, and manually adding or subtracting teach the student an understanding of numbers and mathematics.

The present apparatus and method permit teaching mathematics with a hardware apparatus that has the designed option of using the same apparatus and method displayed on a computer screen. Every part of the apparatus can be depicted on a computer screen using computer software. The identical method of teaching using a computer and a manually operated computer mouse accomplishes the same hardware teaching method while instructing students the relationships between actual hardware items and computer technology.

Accordingly, an object of the invention is to provide for students an apparatus for learning numbers and addition or subtraction procedures.

Another object of the invention is to provide the student with a method to learn mathematics where the student can visualize a number of items in an orderly group related to displayed numbers.

Another object of the invention is to relate numbers to items that are displayed singularly in orderly groups where the student may handle, organize, and manipulate the items according to instructions.

Another object of the invention is to provide for students an uncomplicated graphic apparatus relating numbers to items and quantities.

Another object of the invention is to provide hardware and a method of teaching mathematics that can be depicted on computer monitors and the method of teaching be manually operated on the computer screen similar to using apparatus hardware.

DETAILED DESCRIPTION OF THE PREFERRED EMBODIMENTS

Figure 1:
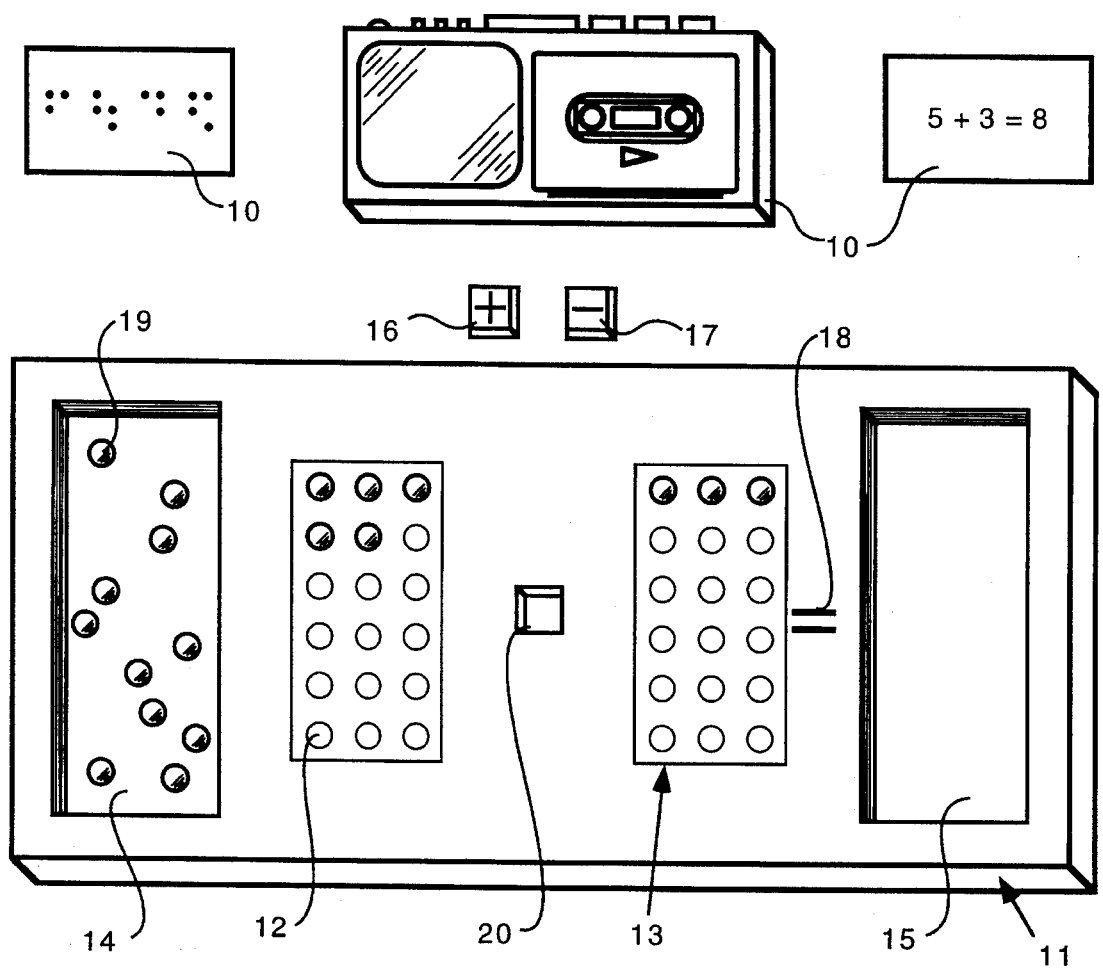
FIG. 1 is a perspective view of the apparatus using marbles as items and information methods to advise students about numbers and mathematical equations that will instruct the student to use the teaching apparatus.

FIG. 1 shows a perspective view of the apparatus including an information instruction means 10, a board means 11, object holding means 12 located in each of two display sections 13, storage bin means 14, receiving bin means 15, moveable and replaceable plus (+) indicator 16 and minus (−) sign indicator 17, equal sign (=) indicator 18, and identical items 19 on the board and in the storage bin. Either the plus or minus indicators may be positioned in receptacle 20 relating to the information instruction means.

The board means 11 is a supporting surface with bin means on opposite ends for storing and receiving items. The board means 11 may be a flat or curved surface with preferably an elongated shape with straight or rounded peripheral sides. Board means construction may be from wood, wood products, cloth, metals, plastics, marble, or combinations of these materials. For plastics, either vacuum formed or molded manufacturing techniques are preferred. The board means may be one rigid surface or be in sections that may fold or be detached. The board means may lay horizontally flat or be supported in vertical or inclined positions depending upon the type of items used.

Figure 2:
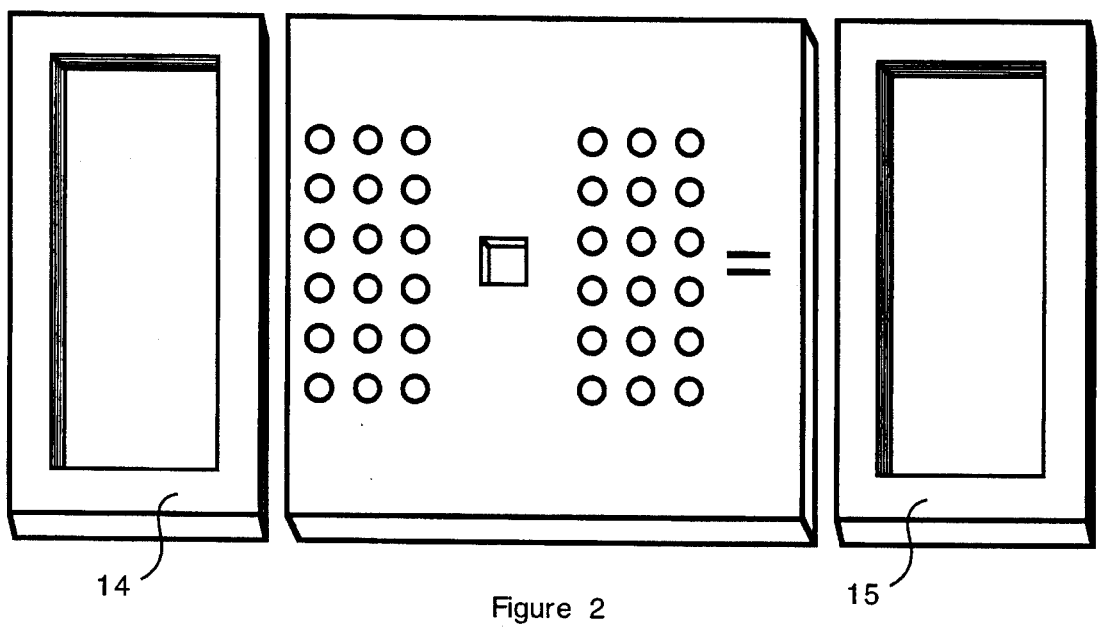
FIG. 2 shows item receiving and storage bins separated from the display sections of the board.

The storage and receiving bin means 14 and 15 are areas or containers for holding items in one place. These bins may have recessed flat surfaces on the bottom of bins, be raised above the board with walls or be separate containers. The preferred recessed bins may be cushioned to hold items, or have indentations in the shape of items to retain and store these items. FIG. 2 shows the board 11 with storage bin 14 and receiving bin 15 detached.

The display section means 13 have receptacle means 12 for displaying and retaining separate and singular items in rows. These receptacle means may be formed indentations similar to the shape and size of the items, for example, round indentations for marbles, slots for chips, shaped holes for pegs, jacks or other elongated items. Magnets and mechanical means such as hooks, nails, screws or Velcro™, can be also used to temporarily hold single items.

Each display section should be preferably designed to hold a plurality of singular items in aligned or staggered rows with at least eighteen items positioned in rows. A pattern display of items is necessary to properly teach. The eighteen positions allow using any single digit number in combination with any other single digit number to a maximum total of eighteen. However, the apparatus and method will teach with fewer or more items and positions. The distribution of items in rows are preferably three rows of six each or likewise, six rows of three each. However, rows using three rows of three positions and four rows of four positions in various groups can also be used.

Figure 3:
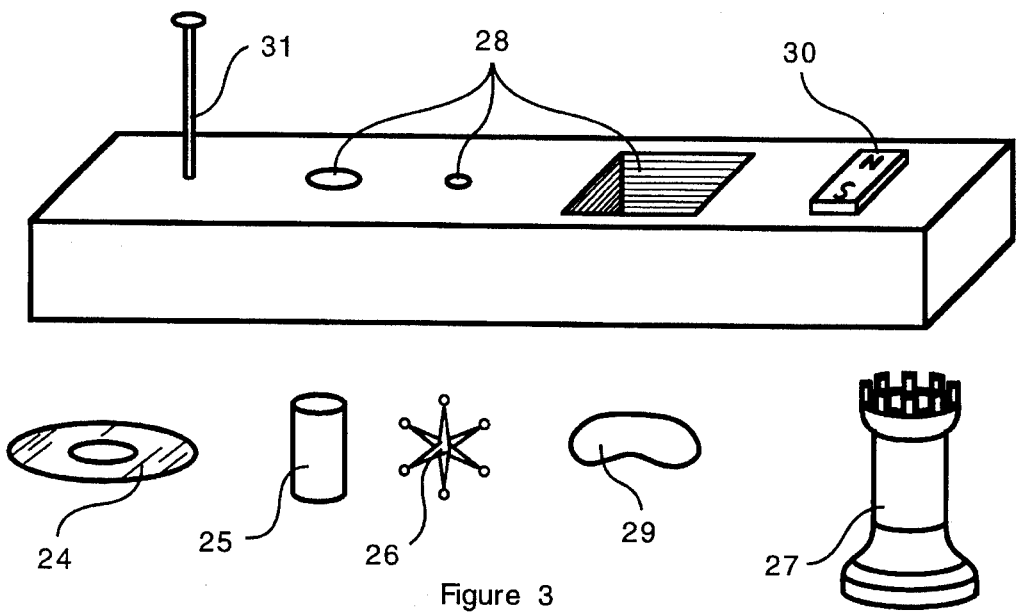
FIG. 3 shows items to be used with the apparatus and methods of retaining these items in rows.

FIG. 3 shows types of identical items and receptacle means for visual display, manual counting, and handling by students. These items should preferably be familiar items to students. Round items 19 in FIG. 1 such as plastic, metal, glass, or marble balls with round recessed receptacles 12 are preferred but other groups of identical items such as disks 24, peg shapes 25, jacks 26, figurines, or other shapes of form 27 in applicable receptacles 28 may be used provided they appear generally identical to other items in the same group. For younger children, food items 29 such as dried beans and corn seeds, and candy in various shapes may also be used with receptacles such as recessed depressions 28. Magnets 30 and mechanical means 31 for retaining individual, identical items are shown. For initial learning, items in a group should be identical or visually similar. Blind students may use palpably shaped similar items. Later, after basic mathematics skills are learned, items may be combined from other groups.

The teaching method comprises presenting the student with information means 10 such as numbers, words, and/or mathematical equations by information instruction. The information means for instructing the student includes verbal, visual, and palpate means to relate a number to items. As shown in FIG. 1 visual information means may include flash cards, pictures of numbers, words, and equations or written displays on surfaces such as paper or blackboards. Numbered dice including those with ten facets having imprinted numbers may be used to instruct. Video information means may also be used. Audio presentations on tapes or verbal instructions are also possible. The information means may include words of instruction relating to the hardware and or relating the hardware to computer monitor displays enabling the student to use either or both teaching means as described below. For the blind students, Braille or palpate systems may be substituted for visual information means.

If the information means includes an equation, either the addition sign 16 or subtraction sign 17 is placed in the receptacle 20 by the student. The student then places the identical items 19 in the respective display sections 13 in rows with the number of items corresponding to the numeral instruction. The student then removes or combines items according to the instruction and counts the items into the receiving bin 15 thereby learning the solution.

The instructive process is shown in FIG. 1 where the information means 10 indicates the numbers 5+3=8 that correspond to the items (marbles) 19 in the display sections 13. The student has manually positioned the plus sign and, then, the student manually counted and placed the items in the proper display section's rows according to the information means. Next, the student will accumulate the marbles, counting them into the receiving bin 15 to determine the answer.

The apparatus is designed to directly relate the teaching of numbers and mathematics to using a computer to accomplish the same tasks. This exposure relates computer displays to actual items and mathematics using identical depicted present apparatus thereby making education interesting and broadening.

Figure 4:
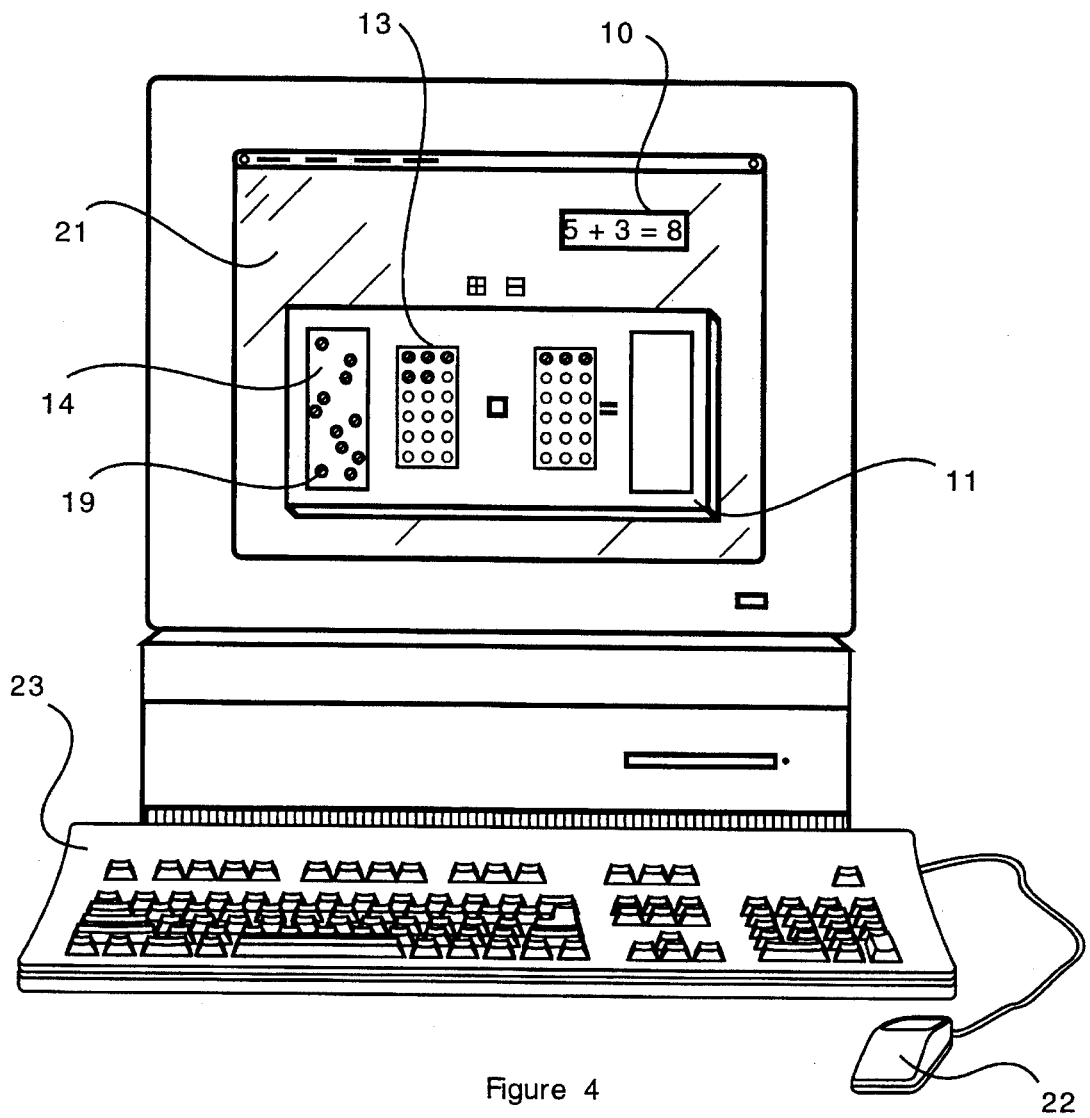
FIG. 4 shows a computer monitor where the apparatus is projected on a computer screen and a computer is used to manipulate the items.

FIG. 4 shows a computer with monitor screen 21 where the apparatus described above for hardware is projected on the computer monitor screen. Part of the screen becomes the board means 11. An information means 10 is also depicted on the screen. Instructive words may also be shown to teach the method of using the depicted hardware and information means. Identical items 19 preferably stored in the storage bin 14 section of the monitor but also may be accumulated and stored elsewhere on the screen. Similar to the hardware shown in FIG. 1, the computer monitor shows rows of receptacles on the display sections 13, and also the replaceable plus or minus sign indicators, a fixed equal sign indicator and a receiving section for items relating to the depicted numbers.

On the computer monitor screen the identical items 19 are images of the mechanical apparatus identical items but computer images such as shapes, letters, numerals, or any other displayed feature 32 may also be used.

A computer manual manipulation device 22 is manually used by the student to position the plus or minus sign and move the items to the rows of screen displayed receptacles according to the depicted numbers. Then all items are preferably assembled to a receiving section 15 or any part of the screen and counted. The instructive method for numbers and mathematics is identical to the hardware method using a board means.

The computer manual manipulation device 22 may include any manual device including movable devices such as balls or other mechanisms in a computer mouse, keyboard keys 23, or touching the screen that when manually activated can move identified graphic items to any desired location on the computer screen.

The depiction of graphics placed on the computer screen may be accomplished by writing a special graphic software application to accomplish this activity. Other desired identical objects and information means are also depicted on the monitor identical to making these components in hardware manufacture. The computer display screen may also be interactive television screens that are analogous in operation to computer display screens for remote teaching.

From the above description of the invention, various changes and modifications on the apparatus and method will occur to those skilled in the art. All such modifications coming within the scope of the appended claims are intended to be included therein.

I claim:

1. An apparatus for teaching numbers and mathematics comprising:

(a) a board means for displaying identical items, (b) said board means having a pair of bin means on opposite ends for receiving said items and two series of display section means for displaying and retaining said identical items, (c) said display section means having rows of receptacle means for holding singular said items, (d) said display sections separated by changeable addition (+) or subtraction (−) signs removably positioned, (e) said board means having an equal (=) sign to the right of said pair of display sections and, (f) an information means for describing said numbers and mathematics that relate to quantities of said identical items for placement on said display sections and manipulation of said items according to said changeable signs.

2. An apparatus for teaching numbers and mathematics as recited in claim 1 wherein said information means are selected from a group consisting of verbal, visual, and palpate instructions.

3. An apparatus for teaching numbers and mathematics as recited in claim 1 wherein said displayed identical item means are selected from the group consisting of metal, plastic, glass or marble balls, disks, pegs, jacks, figurines, and seeds.

4. An apparatus for teaching numbers and mathematics as recited in claim 1 said board means is constructed from materials selected from the group consisting of wood, wood products, cloth, metal, plastic, and marble.

5. An apparatus for teaching numbers and mathematics as recited in claim 1 wherein said rows contain eighteen of said receptacles.

6. An apparatus for teaching numbers and mathematics as recited in claim 1 wherein said board having said bin means separated from said board.

\* \* \* \* \*